(12) United States Patent
Wolf-Monheim

(10) Patent No.: US 10,703,154 B2
(45) Date of Patent: Jul. 7, 2020

(54) CONTROL ARM FOR WHEEL SUSPENSION

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 15/891,122

(22) Filed: Feb. 7, 2018

(65) Prior Publication Data

US 2018/0222266 A1    Aug. 9, 2018

(30) Foreign Application Priority Data

Feb. 8, 2017    (DE) .................... 10 2017 201 980

(51) Int. Cl.
*B60G 7/00*    (2006.01)

(52) U.S. Cl.
CPC ............ *B60G 7/005* (2013.01); *B60G 7/001* (2013.01); *B60G 2204/1244* (2013.01); *B60G 2206/0122* (2013.01); *B60G 2206/10* (2013.01); *B60G 2206/162* (2013.01); *B60G 2206/7101* (2013.01)

(58) Field of Classification Search
CPC .. B60G 7/001; B60G 7/00; B60G 2206/0122; B60G 2206/10; B60G 2206/7101; B60G 2206/16; B60G 2206/162; B60G 2206/72; B60G 2206/7102
USPC ................. 280/124.134, 124.151, 124.133
See application file for complete search history.

(56) References Cited

U.S. PATENT DOCUMENTS

| 6,382,648 B1 * | 5/2002 | Handke ............... B60G 15/063 |
| | | 267/170 |
| 9,302,707 B2 | 4/2016 | Buschjohann et al. |
| 2012/0315414 A1 * | 12/2012 | Wesch ................... B60G 7/001 |
| | | 428/34.1 |
| 2014/0209397 A1 | 7/2014 | Wolf |
| 2015/0343875 A1 | 12/2015 | Spiegel et al. |
| 2016/0046162 A1 | 2/2016 | Seethlaer et al. |
| 2016/0207369 A1 | 7/2016 | Krahn et al. |

(Continued)

FOREIGN PATENT DOCUMENTS

| DE | 102004003151 A1 * | 8/2005 | ............. B60G 7/001 |
| DE | 102006032595 A1 | 1/2008 | |
| DE | 102011082391 A1 | 3/2013 | |

(Continued)

OTHER PUBLICATIONS

Kuch, I. et al., "Development of FRP Rear Axle Components," Feb. 1, 1999, event: International congress & Exposition.

*Primary Examiner* — Keith J Frisby
(74) *Attorney, Agent, or Firm* — Raymond L. Coppiellie; Burgess Law Office, PLLC

(57) ABSTRACT

A control arm for a wheel suspension of a motor vehicle. The control arm including a base body having a spring seat for receiving a helical spring of the wheel suspension. The control arm having a first end region connected to a spring-loaded component of the motor vehicle and a second end region connected to an unsprung component of the motor vehicle. The base body includes a first partial shell composed of steel and a second partial shell composed of a composite material, the shells undetachably fixedly connected to one another at least in one region of the spring seat.

7 Claims, 3 Drawing Sheets

(56) References Cited

U.S. PATENT DOCUMENTS

2019/0009627 A1* 1/2019 Bronswick ............. B60G 7/001

FOREIGN PATENT DOCUMENTS

| DE | 102013004352 A1 * | 9/2014 | ............. B60G 7/001 |
|----|---|---|---|
| DE | 102013207910 A1 | 10/2014 | |
| DE | 102013217769 A1 | 3/2015 | |
| DE | 202015106077 U1 | 11/2015 | |
| WO | WO2015132298 A1 | 9/2015 | |
| WO | WO2017097647 A1 | 6/2017 | |

* cited by examiner

CONTROL ARM FOR WHEEL SUSPENSION

CROSS-REFERENCE TO RELATED APPLICATIONS

Not Applicable.

BACKGROUND OF THE INVENTION

1. Field of the Invention

A control arm for a wheel suspension of a motor vehicle; and, more specifically, a control arm including a body with central region having a spring seat and first and second end regions. The first end region connected to a spring-loaded component of a motor vehicle and the second end region connected to an unsprung component of the motor vehicle.

2. Description of Related Art

Inserting elastic spring elements between a car body of a vehicle and wheels of the vehicle improves vehicle occupant driving comfort because impacts caused by uneven ground are not transmitted directly to the car body. Further, wheel contact with the ground, required for transmission of force, can be maintained when the vehicle travels over uneven ground. Vibrations in the car body caused by uneven ground are damped in a familiar manner by using shock absorbers, which are arranged between the car body and wheel axles. The elastic spring elements may be elastic spiral springs and be an integral component of the shock absorbers.

Control arms guiding a wheel on a wheel suspension of a motor vehicle typically have a portion for supporting a spring or a spring/shock absorber arrangement supported against the car body.

During vehicle operation, the control arms are under load, in particular, a dynamic load, because of the car body and occupant weight and must therefore have sufficient rigidity. Reducing automotive vehicle weight, while maintaining functionality in order to, for example, comply with CO2 limits arising from future legal emission regulations, is desirable.

Proposals that aim to replace parts of wheel suspensions of a motor vehicle with lighter materials should avoid any deficits or drawbacks compared to conventional materials in terms of mechanical strength.

SUMMARY OF THE INVENTION

A control arm for a wheel suspension comprising having a body. The body having a first end region connected to a spring-loaded component and a second end region connected to an unsprung component. The body also including a metallic shell portion and a composite material shell portion, the portions undetachably fixedly connected to one another in one region of the body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Reference is made to the fact that the features and measures listed individually in the following description can be combined with one another in any desired, technically expedient manner and highlight further configurations of the invention. The description additionally characterizes and specifies the invention in particular in conjunction with the figures.

The term "operatively connected" as used herein should be understood to mean objects that are mechanically connected to one another in such a manner that a transmission of a force and/or a torque and/or a torsional moment between the objects is possible. The transmission can be carried out both by direct contact and also indirectly by an intermediate element. The term "provided for" should be understood as designed or arranged for.

The term "helical spring" should be understood to mean a spring formed by a spring wire wound in a helical form. An outer shape of the helical spring can, in this case, be cylindrical, conical or barrel-shaped.

The term "motor vehicle" should be understood to mean a car, a heavy goods vehicle or an autobus, or other vehicle powered by a motor or engine.

The term "undetachably fixedly" should be understood to mean that two undetachably fixedly connected objects can only be detached from one another again with a loss of structural integrity of at least one of the objects. The terms "first," "second," etc. used in this application only serve the purpose of differentiation. No sequence or priority of the objects cited in conjunction with these terms should be implied by the use of said terms.

Figure 1:
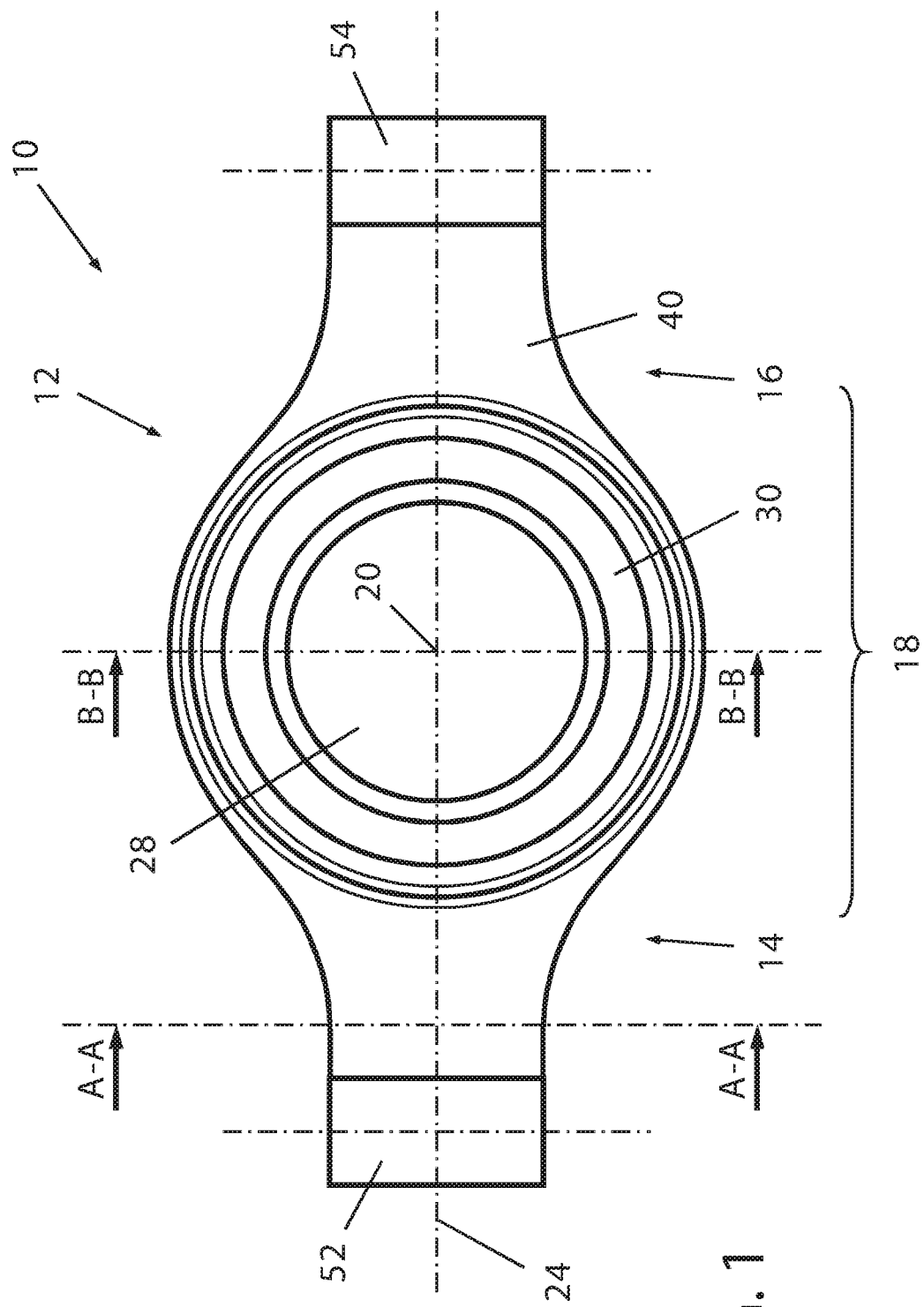
FIG. 1 is a schematic top view of a control arm unit according to one embodiment of the present invention.

FIG. 1 illustrates a control arm unit 10 according to an exemplary embodiment of the invention. The control arm unit 10 suitable for use in a wheel suspension system or assembly of a motor vehicle, including a car.

The control arm unit 10 includes a base body 12 having a first partial shell 34, in one embodiment formed of a metallic material, for example, steel and a second partial shell 40, in one embodiment formed of composite material, for example, a glass fiber-reinforced plastic (GFP) or carbon fiber-reinforced plastic (CFP).

The base body 12 has a first end region 14 and a second end region 16 formed on the base body 12. The first end region 14 and second end region 16 arranged opposite one another in relation to a perpendicular central axis 22 extending through a center 20 of the base body 12, also referred to as the perpendicular central axis of the entire control arm unit 10.

Figure 2:
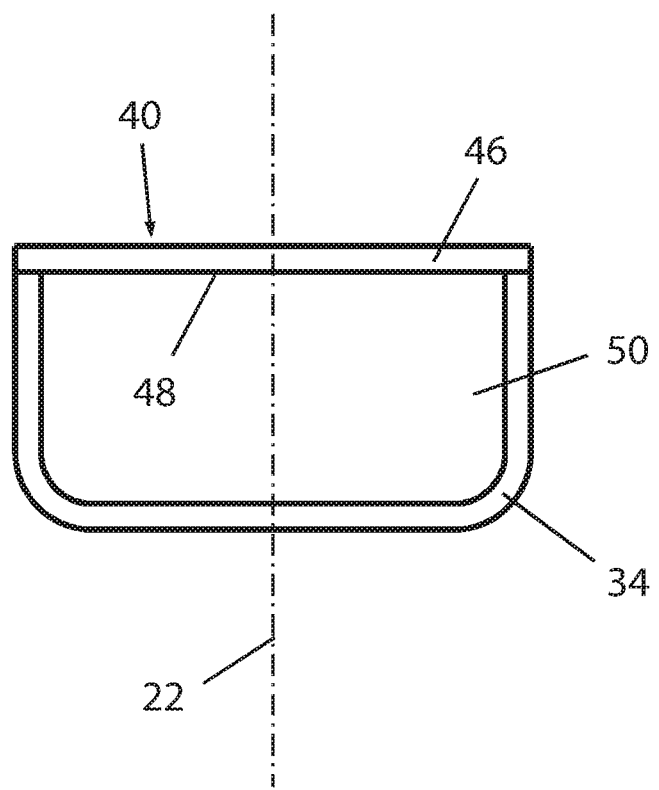
FIG. 2 is a schematic, sectional side view of an end region of the control arm unit of FIG. 1 taken along sectional plane A-A.

The first partial shell 34 configured continuously in a U-shaped profile or portion defining an opening 50 that opens upwards in the plane of the drawing or in the direction of the helical spring 56, wherein the helical spring 56 is located between the upright walls of the U-shaped profile or portion. The opening 50 having a width in a central region 18 of the base body 12 that defines a maximum width when viewed from the schematic top view of FIG. 1 and the cross-sectional view of FIG. 3. The width reduces evenly to its smallest dimension in the direction of both end regions 14, 16 as shown in the cross-sectional view of FIG. 2.

Figure 3:
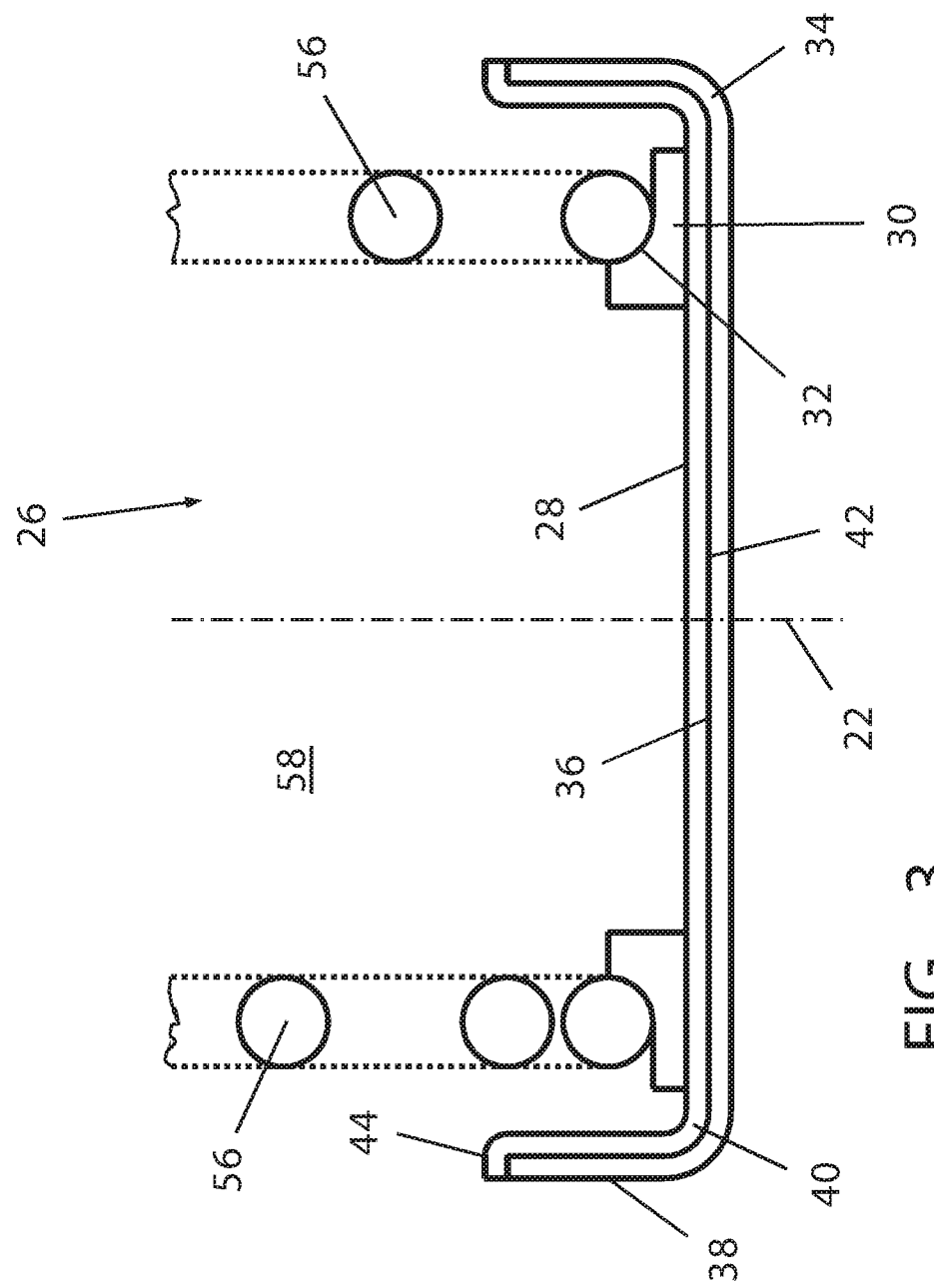
FIG. 3 is a schematic, sectional side view of the base body of the control arm unit of FIG. 1 taken along sectional plane B-B.

As apparent from the sectional side view of FIG. 3, taken along lines B-B of FIG. 1, the second partial shell 40 also has a U-shaped profile, including a portion opening upwards in the central region 18 and arranged between both end regions 14, 16 of the base body 12. The U-shaped first partial shell 34 and the U-shaped profile or portion of the second partial shell 40 in central region 18 of base body 12 are configured complementary to one another wherein in the central region 18 an inside 36 of the U-shaped portion of the first partial shell 34 and an outside 42 of the U-shaped portion of the second partial shell 40 are located adjacent and bear against one another. An upper edge region 44 of the U-shaped portion of the second partial shell 40 extends outward at a right angle and lies on an end portion an upright or leg member of the U-shaped portion of the first partial shell 34 and terminates flush with an outside 38 of the U-shaped portion of the first partial shell 34.

In the central region 18 of the base body 12, an inside 36 of the U-shaped portion of first partial shell 34 and an outside 42 of the U-shaped portion of the second partial shell 40 are undetachably and fixedly connected to one another using a bonding process. The first partial shell 34 and second partial shell 40 having, in the central region 18 of the base body 12, a spring seat 26 having a substantially circular supporting surface 28.

FIG. 1 shows that the spring seat 26 is wider in a direction extending transverse to an imaginary connection line between end regions 14, 16, provided by a longer axis of symmetry 24 of the control arm unit 10, than the width at each of the two end regions 14, 16. The imaginary connection line between end regions 14, 16 lies in the schematic top view of FIG. 1.

The spring seat 26 receives a cylindrical helical spring 56 of the wheel suspension device and includes a ring-shaped elastomer support plate 30 that receives the helical spring 56. The elastomer support plate 30 is fastened centrally on circular supporting surface 28. The elastomer support plate 30 has a bearing surface 32 which, in the installed state of helical spring 56, engages or contacts a surface of helical spring 56 facing an inner space 58 of helical spring 56. Elastomer support plate 30 and helical spring 56 are matched to one another so the helical spring 56, in the installed state, is retained on elastomer support plate 30 by a form fit and frictional connection.

In both the first end region 14 and second end region 16, the second partial shell 40 includes a flat plate 46. Outer regions of an underside 48 of the flat plate 46 bear against the upper web surfaces of the U-shaped portion of the first partial shell 34 and the two are undetachably fixedly connected with a bonding process. The first partial shell 34 and second partial shell 40 are undetachably fixedly connected to one another in end regions 14, 16. The first partial shell 34 and second partial shell 40, at the first end region 14 and second end region 16, close the opening 50 and form a substantially rectangular cross-section. Fixedly connecting the first and second shells 34, 40 forms a closed, hollow structural section at each of the end regions 14, 16.

Each of the end regions 14, 16 partially receives a steel tube 52, 54 connected in a materially engaged manner to first partial shell 34, for example by a welding process.

The steel tube 52 arranged at the first end region 14 receives a cylinder liner that can be pressed into the steel tube 52. The pressed-in cylinder liner at the first end region 14 mechanically, operatively connects the first and region 14 to a spring-loaded component of the motor vehicle, for example, a chassis carrier.

The steel tube 54 arranged at the second end region 16 receives a ball joint that can be pressed into the steel tube 54. The pressed-in ball joint mechanically, operatively connects the second end region 16 to an unsprung component of the motor vehicle, for example, a wheel carrier.

In an exemplary embodiment, the base body 12 has a first partial steel shell 34 and a second partial composite material shell 40, each shell 34, 40 undetachably fixed to the other in at least in one region of the spring seat 26.

The control arm unit 10 meets existing requirements in mechanical strength, buckling load, and lifespan while providing reduced weight compared to conventional control arm units. Use of the composite material helps adhere to existing requirements related to NVH (Noise, Vibration, Harshness).

The composite material of the second partial shell 40 can be formed, for example, as a fiber/plastic composite (FPC). In particular, the composite materials may include carbon-fiber-reinforced plastic (CFP), glass fiber-reinforced plastic (GFP) and/or aramid fiber-reinforced plastic (AFP).

The undetachably fixed connection between the first partial shell 34 and the second partial shell 40 is preferably at least partially laminar. In the context of the exemplary embodiment, the first partial shell 34 and the second partial shell 40 are undetachably connected to one another in a continuous surface region. The undetachably fixed connection between the first partial shell 34 and the second partial shell 40 may be an adhesive connection. However, other methods are also suitable to form the undetachably fixed connection between the first partial shell 34 and the second partial shell 40.

The unsprung components of the motor vehicle can be formed, for example, by a wheel carrier or an axle guide. The spring-loaded component of the motor vehicle can be formed, for example, by a vehicle car body or an auxiliary frame structure, such as a chassis carrier.

The first end region 14 and the second end region 16 are arranged opposite one another in relation to the spring seat 26, enabling an effective transmission of force between the spring-loaded component and the unsprung component of the motor vehicle.

In one embodiment of the control arm unit 10, the spring seat 26 is wider in at least one direction extending transverse to an imaginary connection line between the end regions 14, 16 than the width at each of the two end regions 14, 16. The embodiment provides a compact solution for the transmission of force between the spring-loaded component and the unsprung component of the motor vehicle for use with helical springs having a large outer diameter.

At least one of the end regions 14, 16 of the control arm unit 10 has a metallic tube connected by material engagement to the first partial shell 34. The metallic tube enables a structurally simple connection between the control arm unit and the unsprung component or the spring-loaded component of the motor vehicle. The material engagement between the metallic tube and the first partial shell is preferably produced by a welded connection.

A metallic tube for receiving a cylinder liner or ball joint provides a structurally simple connection between the control arm unit and the unsprung component or the spring-loaded component of the motor vehicle. The cylinder liner or the ball joint may be pressed into the metallic tube.

The control arm unit 10 includes the spring seat 26 having an elastomer, or elastomeric, support plate 30 configured to receive the helical spring 56. The elastomer support plate 30 reduces transmission of structure-borne noise between the helical spring 56 and the control arm unit 10 thereby reducing generation of noise and vibrations enabling adherence to existing NVH requirements.

The elastomer support plate 30 has a bearing surface 32 which, in an installed state of the helical spring 56, comes into mutual bearing with a surface part of the helical spring 56. The surface part of the helical spring facing an inner space or an outer space of the helical spring. The spring seat 26 helps maintain the desired position of the received helical spring 56, in particular in a lateral direction. The helical spring 56 may be retained on the elastomer support plate 30 by form fit or by form fit and frictional connection.

In one embodiment, the first partial shell 34 and second partial shell 40 each have complementary U-shaped profiles in one region of the spring seat 26. The complementary U-shaped profiles enable a particularly large-surface, undetachably fixed connection between the first partial shell 34 and the second partial shell 40. The U-shaped profiles help increase the bending and torsional stiffness of the control arm unit 10.

If the second partial shell 40 is undetachably fixedly connected in the end regions to the first partial shell 34, the bending and torsional stiffness of the control arm unit can be further increased. The undetachably fixed connection between the first partial shell 34 and the second partial shell 40 in one of the end regions can be produced by an adhesive connection or similar connection method.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension component comprising:
   a body having a first end region, a second end region, and a central region having a spring seat;
   said body having a metallic portion and a composite material portion, said portions having complementary U-shaped portions in the central region;
   the U-shaped portion of the metallic portion having an inside surface and the U-shaped portion of the composite material portion having an outside surface, the inside surface and the outside surface undetachably fixedly connected continuously along an axis extending through a center of the body and perpendicular to a longitudinal axis of the body;
   said metallic portion having a U-shaped portion at said first and second end regions and said composite material portion having a planar portion at said first and second end regions; and
   said metallic and composite material portions undetachably fixedly connected at said end regions and forming a closed, hollow structural section.

2. The wheel suspension component of claim 1 including spring seat having an elastomer support plate adapted to support a helical spring.

3. The wheel suspension component of claim 1 including a width of the central region, in a direction transverse to a connection line between the first and second end regions, greater than the width of each of the first and second end regions, in the same transverse direction.

4. The wheel suspension component of claim 1 including an outwardly extending upper flange of the U-shaped portion of the composite material portion, said upper flange extending radially outwardly and above a leg member of the U-shaped portion of the metallic portion and terminating flush with an outside of the U-shaped portion of the metallic portion.

5. The wheel suspension component of claim 1 wherein at least one of the first and second end regions includes a metallic tube materially connected to the metallic portion.

6. A wheel suspension component comprising:
   a body having a central region with a spring seat;
   the body having a first end region and a second end region;
   the body having a U-shaped metallic shell portion and a composite material shell portion, the composite material shell portion having a U-shape in the central region;
   the U-shaped portion of the metallic portion having an inside surface and the U-shaped portion of the composite material portion having an outside surface, the inside surface and the outside surface, undetachably fixedly connected continuously along an axis extending through a center of the body and perpendicular to a longitudinal axis of the body;
   a width of the central region, in a direction perpendicular to the longitudinal axis of the body, is greater than the width of each of the first and second end regions, in the same perpendicular direction; and
   an outwardly extending upper flange of the composite material portion, said upper flange extending radially outwardly and above a leg member of the metallic shell portion and terminating flush with an outside of the metallic shell portion.

7. The wheel suspension component of claim 6 wherein said metallic shell portion has a continuously U-shaped cross section and only a portion of said composite material portion has a U-shaped cross section.

* * * * *